US009576216B2

(12) United States Patent
Tillotson

(10) Patent No.: US 9,576,216 B2
(45) Date of Patent: Feb. 21, 2017

(54) HYPERSPECTRAL RESOLUTION USING THREE-COLOR CAMERA

(71) Applicant: The Boeing Company, Chicago, IL (US)

(72) Inventor: Brian J. Tillotson, Kent, WA (US)

(73) Assignee: The Boeing Company, Chicago, IL (US)

( * ) Notice: Subject to any disclaimer, the term of this patent is extended or adjusted under 35 U.S.C. 154(b) by 65 days.

(21) Appl. No.: 14/535,485

(22) Filed: Nov. 7, 2014

(65) Prior Publication Data

US 2016/0132748 A1 May 12, 2016

(51) Int. Cl.
| *H04N 9/04* | (2006.01) |
| *G06K 9/46* | (2006.01) |
| *H04N 5/232* | (2006.01) |
| *G02B 5/20* | (2006.01) |
| *G02B 5/28* | (2006.01) |
| *G01J 3/00* | (2006.01) |
| *G06K 9/00* | (2006.01) |

(52) U.S. Cl.
CPC ............ *G06K 9/4652* (2013.01); *G01J 3/00* (2013.01); *G02B 5/201* (2013.01); *G02B 5/28* (2013.01); *H04N 5/23229* (2013.01); *G06K 2009/00644* (2013.01)

(58) Field of Classification Search
CPC .................................................... G06K 9/4652
USPC .......................................................... 348/268
See application file for complete search history.

(56) References Cited

U.S. PATENT DOCUMENTS

| 6,490,075 B1* | 12/2002 | Scheps | G01J 3/2823 |
| | | | 250/235 |
| 8,659,656 B1* | 2/2014 | Cruz-Albrecht | G06K 9/00986 |
| | | | 341/138 |
| 2011/0069189 A1* | 3/2011 | Venkataraman | H01L 27/14618 |
| | | | 348/218.1 |
| 2014/0193050 A1 | 7/2014 | Miller | |

FOREIGN PATENT DOCUMENTS

| JP | 2005300509 A | 10/2005 |
| WO | 2013116253 A | 8/2013 |

OTHER PUBLICATIONS

U.K. Patent Office Action dated May 5, 2016, U.K. Patent Application No. GB1519662.9 (British counterpart to the instant patent application).
English Abstract of JP2005300509A.

* cited by examiner

*Primary Examiner* — Gary C Vieaux
(74) *Attorney, Agent, or Firm* — Ostrager Chong Flaherty & Broitman P.C.

(57) ABSTRACT

A method for capturing hyperspectral images using a regular color camera. In the method, the camera takes multiple images of a scene, with the camera oriented differently for each image. For a camera carried by an aircraft or spacecraft, this allows hyperspectral imaging without the cost or weight of a hyperspectral camera.

20 Claims, 12 Drawing Sheets

HYPERSPECTRAL RESOLUTION USING THREE-COLOR CAMERA

BACKGROUND

This disclosure generally relates to systems and methods for spectral analysis and, more particularly, to systems and methods for hyperspectral imaging.

Hyperspectral images are a category of digital color images. A digital image is represented in a computer by a two-dimensional array of elements. For a monochrome image, each element is a scalar representing intensity of light. For a color image, each element is a vector of two or more scalar values representing intensity at various wavelengths of light. In the color images used in common computer systems and cameras, each element has three scalar values of intensity: one each for red, green, and blue wavelengths (see FIG. 1A) or one each for cyan, yellow, and magenta wavelengths. In a hyperspectral image, each element has more than three values—sometimes many more (see FIG. 1B). Such an image provides fine-grained spectral data that can be useful in quality control (especially of paint coatings), agriculture, oceanography, oil and mineral prospecting, pollution tracking, medical diagnostics, and military surveillance.

One reason hyperspectral images are not used more often is that these images are typically created using hyperspectral cameras. Unlike a conventional color camera which applies three filter colors to each pixel, a typical hyperspectral camera uses dozens of filter colors, or it uses a diffraction grating at each image location to scatter light of different colors onto dozens of separate elements of a charge coupled device (hereinafter "CCD image sensor"). There are many types of hyperspectral camera. In one type, a filter wheel is configured to position several narrow-band filters in front of a single camera. That filter wheel is positioned by an electromechanical actuator. Another type of hyperspectral camera includes a mechanically variable interferometer disposed in front of a single camera and an electromechanical actuator. A third type is a line-scan imaging spectrometer that uses a strip of diffraction grating (or prism) to scatter light from a slit aperture onto a two-dimensional array of sensor elements. The device must be scanned by rotation or translation to cover a spatial two-dimensional scene. It also contains an electromechanical actuator, which reduces the reliability of an aircraft mission system. Yet another type comprises multiple cameras facing the same direction, each with a different filter in front of it. The foregoing complications make hyperspectral cameras heavy, bulky, and expensive.

Without access to a hyperspectral camera, some systems rely on ordinary color cameras or even monochrome cameras. Data from these are supplemented by other systems, such as a thermal imaging camera, radar, or measurements involving physical contact. These other systems are typically heavy and expensive.

It would be advantageous if hyperspectral images could be acquired using a small, cheap camera, such as a conventional color camera, without the need for supplemental data from another system.

SUMMARY

The subject matter disclosed in detail below comprises systems and methods for acquiring hyperspectral images using a conventional color camera. The system preferably comprises the following components: (1) a conventional color camera (i.e., at least two colors with some overlap in the spectral bands); (2) a platform that allows the camera to rotate about at least one axis, e.g., the vertical axis; (3) a computer in communication with the camera and (in some embodiments) with the platform; and (4) executable software stored in a memory of the computer. The software may comprise modules for controlling operations of the camera and platform, a module for processing image data to resolve fine-grained spectral bins at selected locations in a scene, and a module for outputting data records of fine-grained spectral information for selected locations A hyperspectral imaging method in accordance with one embodiment comprises the following steps: (1) the camera is installed on the platform; (2) if insufficient technical information about the camera is available (e.g., from the manufacturer), a calibration process is used to determine how optical transmittance of the color filter varies with incidence angle at various wavelengths (this step is performed only once); (3) the user or the computer directs the camera to take multiple images of the same target, orienting the camera to put the target off-center by a different angle for each image; (4) the computer inputs the image data from the camera; (5) software running on the computer processes the images to resolve fine-grained spectral bins at selected locations in the scene; and (6) the computer outputs a data record of fine-grained spectral information for the selected locations.

One aspect of the subject matter disclosed in detail below is a method of measuring the spectrum of at least one point in a scene, comprising: characterizing a camera which comprises a multi-color filter array and an array of photosensors; locating the camera at a position with a first orientation so that a scene is within a field of view of the camera; capturing a first image of the scene while the camera is at the position with the first orientation; locating the camera at the position with a second orientation so that the scene is within the field of view of the camera; capturing a second image of the scene while the camera is at the position with the second orientation; transferring the first and second images from the camera to a computer; and computing the spectrum of a point in the scene based on at least the first and second images, the computing being performed by the computer system. In accordance with some embodiments, characterizing the camera comprises measuring a transmittance as a function of wavelength and of incidence angle, and the computed spectrum comprises intensity values for each of a multiplicity of synthetic spectral bands. In accordance with those same embodiments, the first and second images respectively comprise first and second pixels corresponding to the point in the scene, which pixels each comprise first and second RGB triplets of intensity values. Then the method may further comprise: computing a first set of transmittance values for a multiplicity of synthetic spectral bands at a first angle of incidence of a light ray from the point in the scene to a first photosensor corresponding to the first pixel; computing a second set of transmittance values for the multiplicity of synthetic spectral bands at a second angle of incidence of a light ray from the point in the scene to a second photosensor corresponding to the second pixel; and forming a matrix of transmittance values that includes the first and second sets of transmittance values, wherein computing the spectrum comprises respectively multiplying the intensity values of the first and second RGB triplets by elements of a matrix which is an inverse of the matrix of transmittance values.

The camera can be attached to a vehicle or a robot. Locating the camera comprises maneuvering the vehicle or robot. The vehicle is one of the following group: an aircraft (e.g., an unmanned aerial vehicle), a spacecraft, a ground vehicle, a boat, or a submersible.

Another aspect of the subject matter disclosed in detail below is a method for measuring the spectrum of at least one point in a scene, comprising: characterizing a camera which comprises a multi-color filter array and an array of photosensors; mounting the camera on an unmanned aerial vehicle; flying the unmanned aerial vehicle along a first flight path, the unmanned aerial vehicle being oriented such that the camera has a first orientation, a scene is within a field of view of the camera, and light from a point in the scene impinges on a first photosensor of the camera; capturing a first image of the scene while light from the point in the scene is impinging on the first photosensor; flying the unmanned aerial vehicle along a second flight path, the unmanned aerial vehicle being oriented such that the camera has a second orientation different than the first orientation, the scene is within the field of view of the camera, and light from the point in the scene impinges on a second photosensor of the camera; capturing a second image of the scene while light from the point in the scene is impinging on the second photosensor; transferring the first and second images from the camera to a computer; and computing the spectrum of the point in the scene based on at least the first and second images, the computing being performed by the computer system.

A further aspect is a system for measuring the spectrum of at least one point in a scene, comprising: a color camera comprising a multi-color filter array and an array of photosensors covered by the multi-color filter array; and a computer system for receiving images from the color camera, the computer system comprising memory for storing a characterization of the color camera and being programmed to perform the following operations: computing the spectrum of a point in the scene based on multi-color intensity values of light from the point in the scene which impinges on respective photosensors during capture of respective images of the scene by the color camera. The characterization of the camera comprises transmittance values which are a function of wavelength and of incidence angle. In accordance with some embodiments, the computer system is further programmed to perform the following operations: computing a first set of transmittance values for a multiplicity of synthetic spectral bands at a first angle of incidence of a light ray from the point in the scene to a first photosensor; computing a second set of transmittance values for the multiplicity of synthetic spectral bands at a second angle of incidence of a light ray from the point in the scene to a second photosensor; and forming a matrix of transmittance values that includes the first and second sets of transmittance values, wherein computing the spectrum comprises multiplying the multi-color intensity values by elements of a matrix which is an inverse of the matrix of transmittance values. The computed spectrum comprises intensity values for each of a multiplicity of synthetic spectral bands. The system may further comprise a vehicle or a robot, the color camera being attached to the vehicle or robot.

Other aspects systems and methods for hyperspectral imaging using a color camera are disclosed in the detailed description that follows.

BRIEF DESCRIPTION OF THE DRAWINGS

FIG. 9 shows how the spectral bands change with angle of incidence (i.e., as a function of position on the focal plane). For each of three colors, three curves are drawn for respective angles of incidence: 0 rad (solid curve); 0.4 rad (dashed curve); and 0.8 rad (dotted curve).

FIG. 10A shows the rotation in the target frame of reference. FIG. 10B shows the rotation in the camera frame of reference, with filter colors.

Reference will be made to the drawings in the detailed description that follows.

DETAILED DESCRIPTION

Various embodiments of systems and methods for hyperspectral imaging will be described below in detail. The following detailed description is illustrative in nature and not intended to limit claim coverage to the disclosed embodiments or to the disclosed applications and uses of the disclosed embodiments.

As used herein, the term "pixel" refers to a physical point in an image. Each pixel in the image has an intensity value based on the output of a respective photosensor in a focal plane array (FPA) of a color camera. In accordance with some embodiments, the photosensors are p-doped MOS capacitors of a CCD image sensor. The photosensors of the focal plane array are covered by a mask made up of a multiplicity of color filters referred to herein as a "color filter array". Each photosensor is covered by a respective color filter (red, green or blue).

Figure 1A:
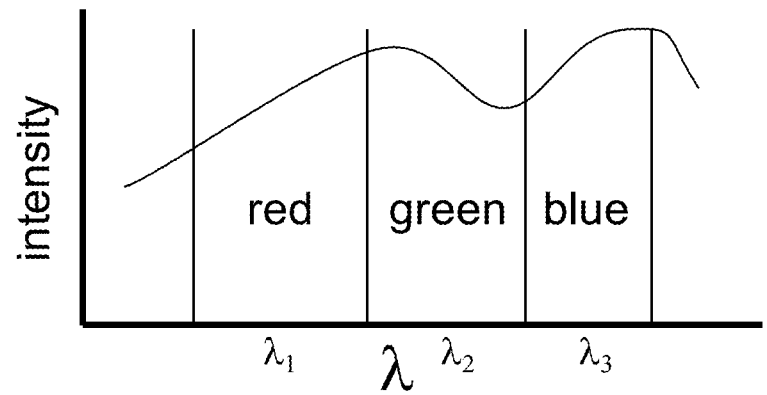
FIG. 1A is a graph of intensity versus wavelength for a pixel in a color image, the intensity values being segregated into bins. For each pixel, ordinary color images have three bins of intensity versus wavelength: red, green and blue.
Figure 1B:
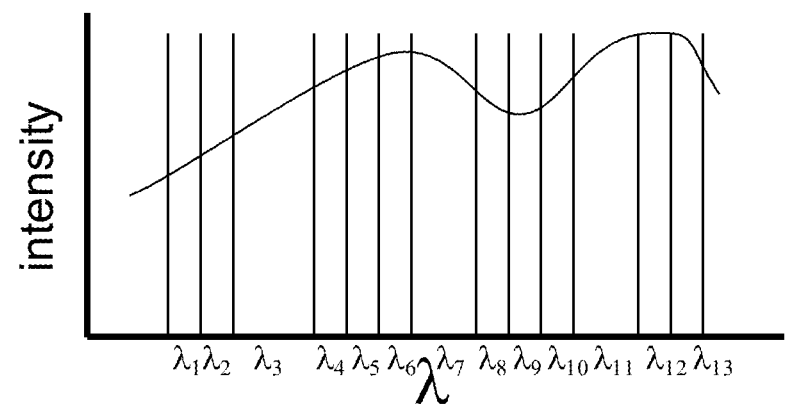
FIG. 1B is a graph of intensity versus wavelength for a pixel in a hyperspectral image. For each pixel, hyperspectral images have many bins of intensity versus wavelength.
Figure 2:
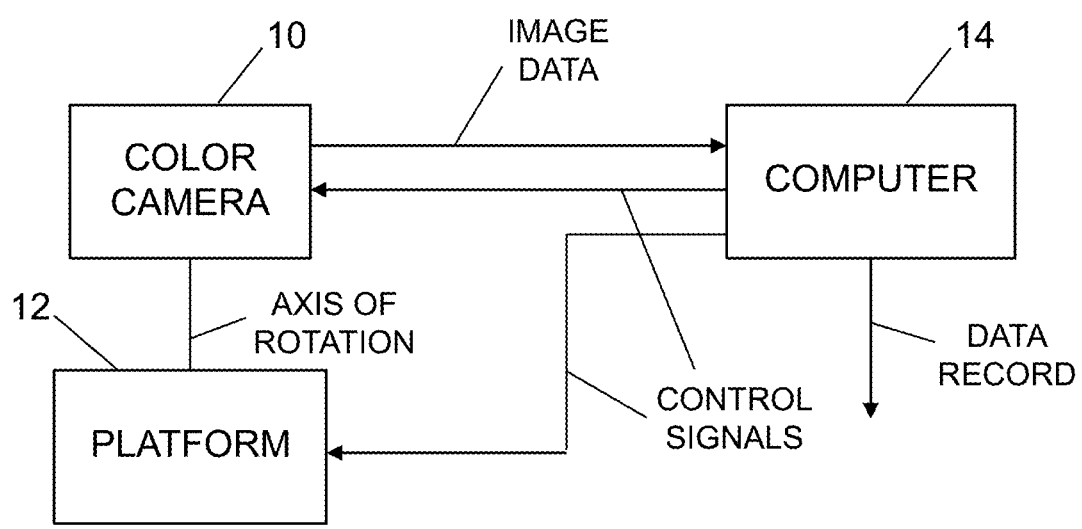
FIG. 2 is a block diagram showing some components of a hyperspectral imaging system in accordance with some embodiments.

Some components of a hyperspectral imaging system in accordance with some embodiments are schematically depicted in FIG. 2. The depicted components include the following: (1) a conventional camera 10 (i.e., at least two colors with some overlap in the spectral bands); (2) a platform 12 that allows the camera 10 to rotate about at least one axis, e.g., the vertical axis; (3) a computer 14 in communication with the camera 10 and (in some embodiments) with the platform 12; and (4) executable software loaded in memory (e.g., read only memory) in the computer 14. The computer 14 may comprise a frame grabber (not shown in FIG. 2) for inputting the image data from the camera 12 into computer memory (e.g., random access memory).

The software may comprise the following modules (not shown in FIG. 2): (a) a module for controlling the operations of the camera 10; (b) a module for controlling the operations of the platform 12; (c) a module for processing image data to resolve fine-grained spectral bins at selected locations in a scene within the field of view of camera 10; and (d) a module for outputting data records of fine-grained spectral information for selected locations. As shown in FIG. 2, the computer 14 has ports for outputting control signals to the camera 10 and platform 12, a port for inputting image data from the camera 10, and a port for outputting data records.

Figure 3:
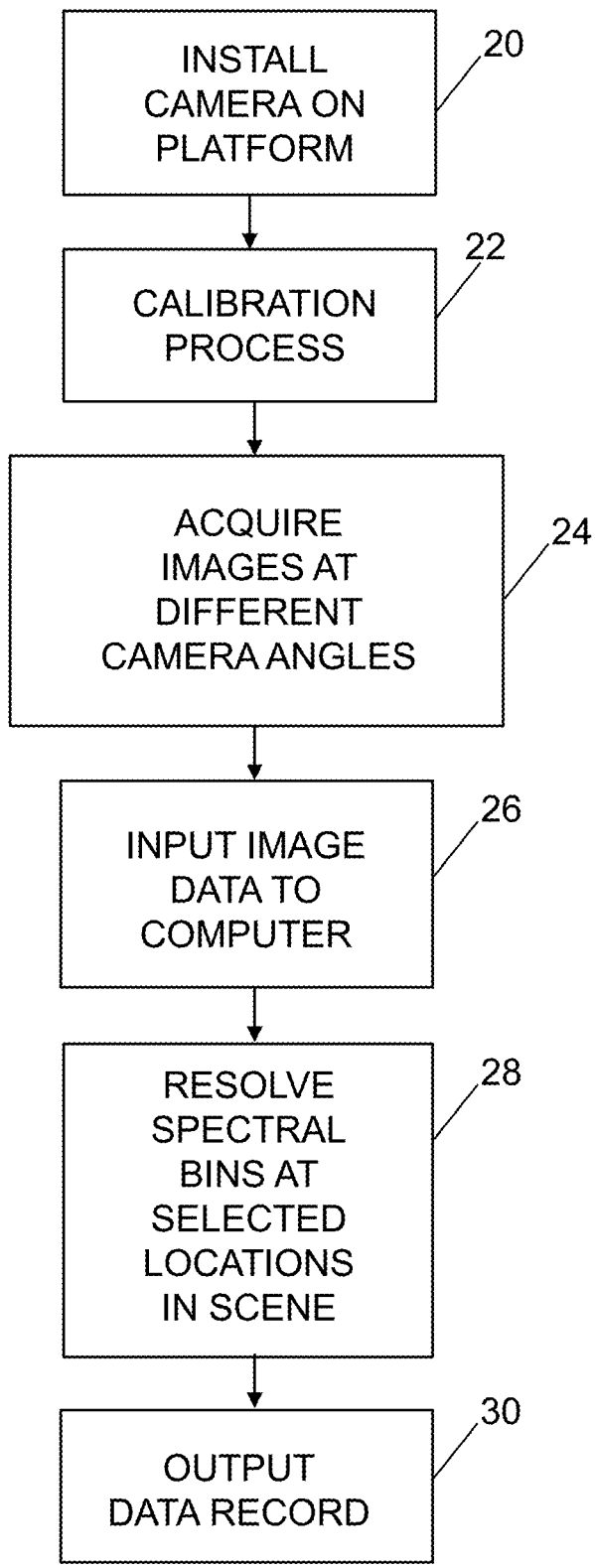
FIG. 3 is a flowchart showing some steps of a method for hyperspectral imaging in accordance with one embodiment.

FIG. 3 is a flowchart showing some steps of a method for hyperspectral imaging in accordance with one embodiment. This method may employ a system of the type depicted in FIG. 2. First, the camera 10 is installed on the platform 12 (step 20). If insufficient technical information about the camera is available (e.g., from the manufacturer), a calibration process is used to determine how optical transmittance of the color filter array varies with incidence angle at various wavelengths (step 22). This step is performed only once. At the commencement of a hyperspectral imaging operation, the user or the computer directs the camera to take multiple images of the same target, orienting the camera to put the target off-center by a different angle for each image (step 24). During the imaging operation, the computer 14 inputs the image data from the camera 10 (step 26). Typically this is done by a frame grabber in the computer 14. The software on the computer 14 processes the images to resolve fine-grained spectral bins at selected locations in the scene (step 28). When processing has been completed, the computer 14 outputs a data record of fine-grained spectral information for the selected locations (step 30).

In accordance with alternative embodiments, the camera may be mounted to a flight vehicle (i.e., the platform 12 is a flight vehicle), in which case the camera 10 need not be rotatable relative the platform 12. The camera's orientation can be controlled by maneuvering the flight vehicle. In this implementation, the computer 14 may communicate with a flight control computer onboard the flight vehicle.

The system components shown in FIG. 2 and the process steps depicted in FIG. 3 are described in more detail below.

Figure 4:
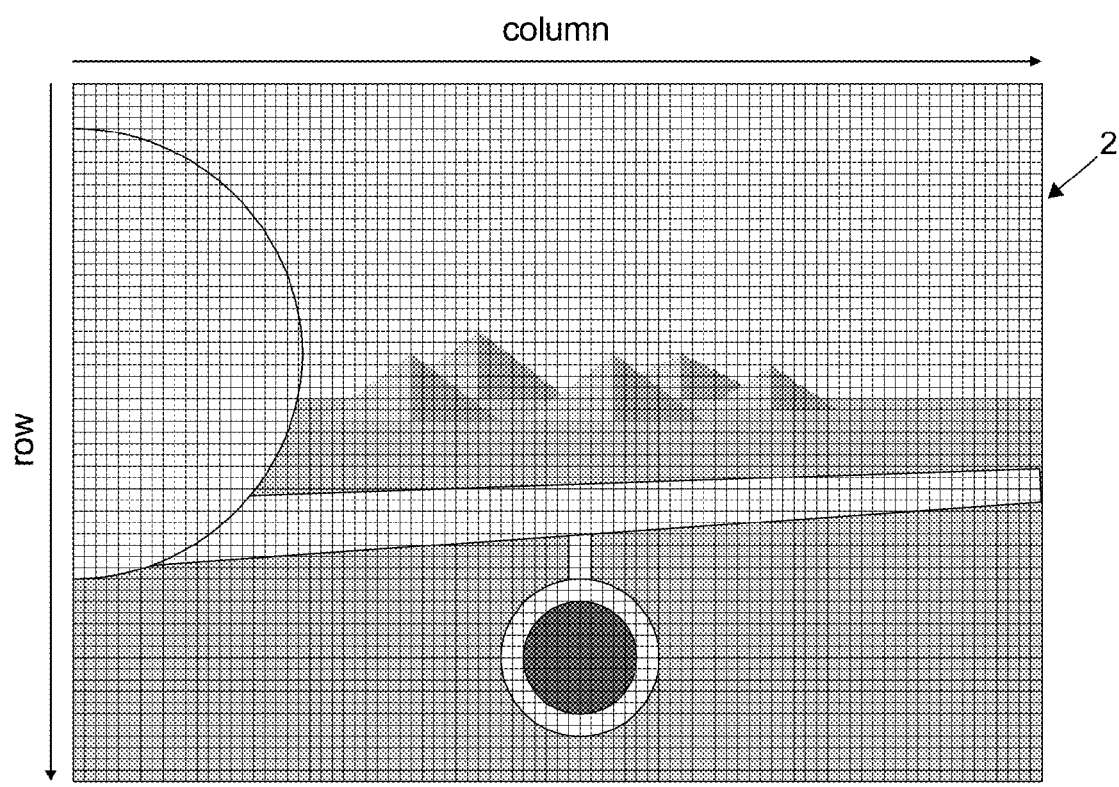
FIG. 4 is a diagram representing a scene decomposed into an array of pixels by an image capture process.

FIG. 4 is a diagram representing a scene decomposed into an array of pixels by an image capture process. FIG. 4 shows the coordinate system of a typical image frame (column index is horizontal from left; row index is vertical from top). A camera captures a continuous scene as an array of intensity values, one value corresponding to each "pixel" or picture element, which is located by its column and row. The intensity of the pixel is proportional to the average radiance of all the scene points covered by the pixel.

"Scene points" are defined in a second coordinate system: scene coordinates, or scene location, that identify particular physical points in the world. The triplet vector r (latitude, longitude, altitude) is an example of scene coordinates. If one takes two photos of a scene and rotates the camera between photos, many of the same scene locations may be seen in both photos, but each scene location r will typically appear at different pixel coordinates (row and column) in the two photos. Likewise, the same set of pixel coordinates occurs in both images, but a given pixel will typically map to two different scene locations in the two photos.

Figure 5:
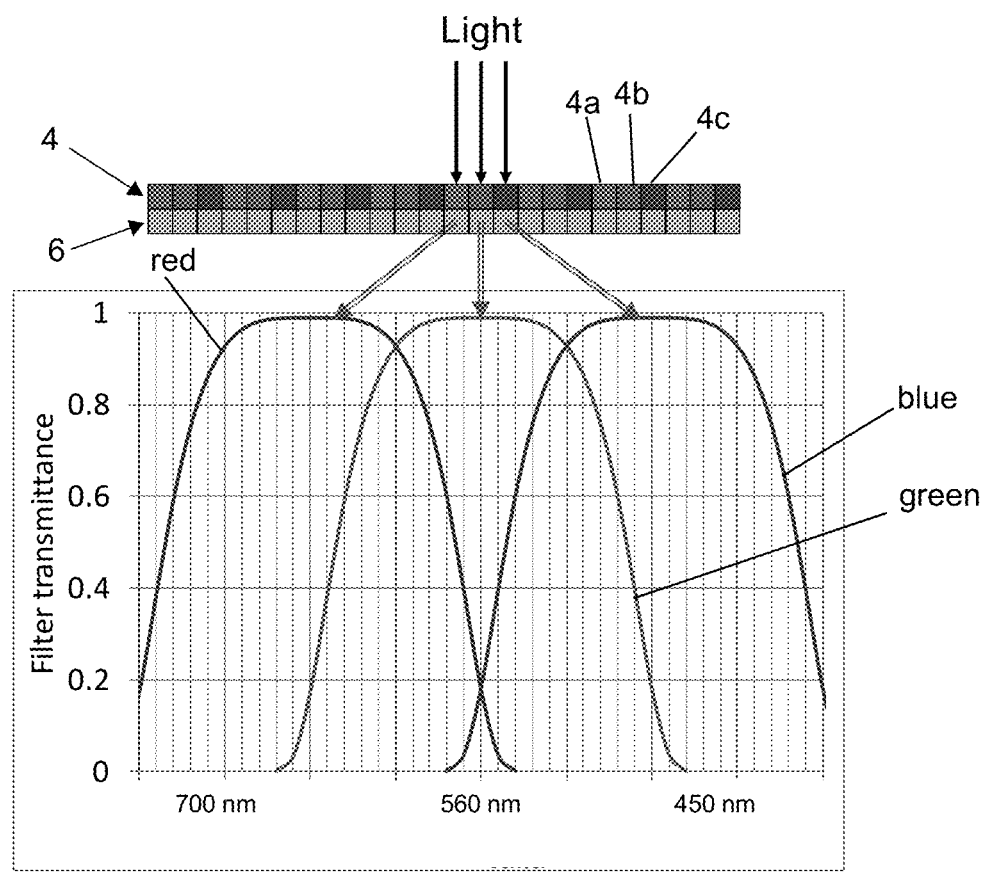
FIG. 5 includes a diagram showing light incident on a focal plane array of a CCD image sensor and a graph of filter transmittance versus wavelength for light impinging on three photosensors covered by green, red and blue filters respectively.

FIG. 5 includes a diagram showing light incident on a focal plane array 6 (e.g., of a CCD image sensor) of a color camera. The focal plane array 6 comprises a multiplicity of photoactive regions (referred to herein as "photosensors") arranged in rows and columns. The focal plane array 6 depicted in FIG. 5 is covered by a color filter array 4 comprising red, green and blue filters 4a-4c arranged in a pattern (e.g., a Bayer filter). Each color filter covers a respective photosensor of the focal plane array 6. Each photosensor is capable of converting photons into electric charges. In a CCD image sensor, a multiplicity of p-doped MOS capacitors serve as the photosensors of the focal plane array. Incident light causes each capacitor to accumulate an electric charge proportional to the light intensity at that location.

FIG. 5 also includes a graph of filter transmittance versus wavelength for light impinging on three photosensors covered by green, red and blue filters respectively. FIG. 5 shows how light from a scene determines RGB pixel values. Each color filter 4a-4c passes light with a range of wavelengths shown in the plot; other wavelengths are absorbed. There is substantial overlap in wavelengths passed by adjacent bands, e.g., some wavelengths are passed fairly well by both the red and green filters 4a and 4b, and some are passed fairly well by both the green and blue filters 4b and 4c.

The transmittance function T(λ) defines the color filter bands. Each filter has the highest transmittance at wavelengths near the center of the band. Transmittance falls off at wavelengths farther from the center of the band. Each narrow slice of spectrum contributes to the total intensity measured for red, green, and/or blue bands; the slice's contribution is proportional to the filter's transmittance at that wavelength. This is shown in the following matrix equation:

$$\begin{bmatrix} R \\ G \\ B \end{bmatrix} = \begin{pmatrix} T_{R1} T_{R2} \ldots T_{RM} \\ T_{G1} T_{G2} \ldots T_{GM} \\ T_{B1} T_{B2} \ldots T_{BM} \end{pmatrix} \begin{bmatrix} I_{\lambda 1} \\ I_{\lambda 2} \\ \ldots \\ I_{\lambda M} \end{bmatrix} \quad (1)$$

where R, G, and B are the intensities of red, green, and blue; the right-hand column matrix contains the intensity values $I_{\lambda j}$ in each narrow slice of spectrum centered at wavelength $\lambda_j$ (where j=1, 2, ..., M), and transmittance values T(RGB, j) appear in the two-dimensional array.

Multiplication of the narrow intensity values by the transmittance values, and summing all those products for each R, G, or B band, gives the measured pixel values, i.e., the amount of light that gets through the filter to each pixel. The matrix equation can be written in shorthand as:

$$P = TI \qquad (2)$$

where P is the pixel vector, T is the transmittance matrix, and I is the intensity vector. This notation will be used again below.

Figure 6:
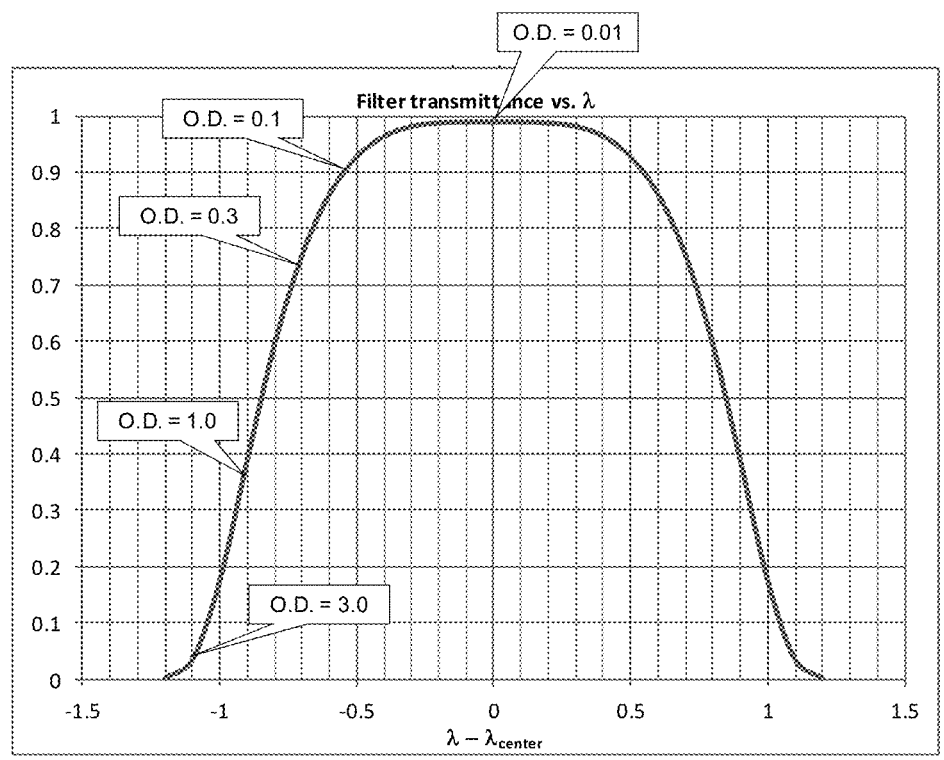
FIG. 6 is a graph of filter transmittance versus wavelength for light impinging on a filter of a color filter array. This graph also shows that transmittance is related to optical depth (O.D.). The horizontal axis is wavelength relative to the center of a filter's spectral band ($\lambda_{center}$).

The concepts of transmittance and optical depth are related, as illustrated by FIG. 6, in which the horizontal axis is wavelength relative to the center of the filter's spectral band ($\lambda_{center}$). Like transmittance, optical depth is a function of wavelength $\lambda$, and of the distance light must pass through the filter. These quantities are related by the following equations:

$$T(\lambda) = \exp(-\tau(\lambda)) \qquad (3)$$

where $\tau$ is optical depth and optical depth is defined by $$\tau(\lambda) = \int \alpha(\lambda) ds \qquad (4)$$

where $\int$ means integration, $\alpha(\lambda)$ is absorptivity at wavelength $\lambda$, and s is distance along the optical path.

The plot in FIG. 6 shows how well a camera's color filters will transmit various wavelengths when the light is perpendicular to a CCD image sensor. In a camera, however, some light does not arrive perpendicular to the CCD image sensor.

Figure 7A:
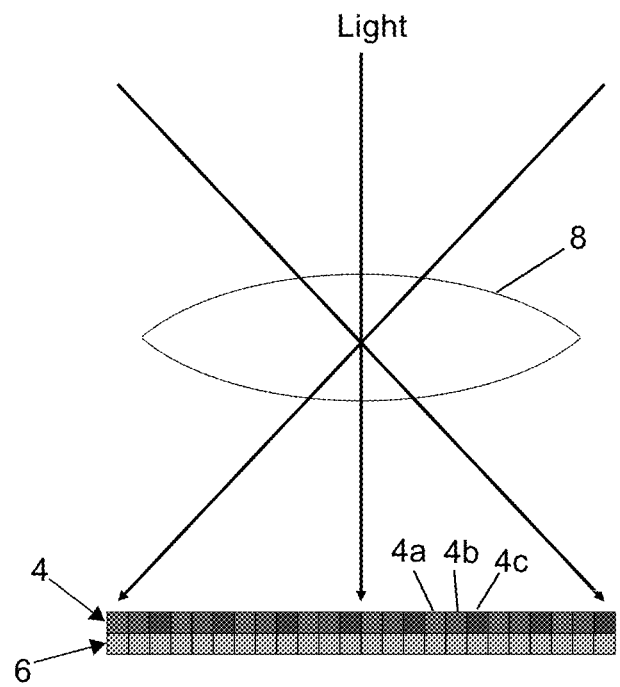
FIG. 7A is a diagram showing light passing through a lens and impinging on a focal plane array of a wide-angle color camera, the angle of incidence being large at the edges of the focal plane.

FIG. 7A is a diagram showing light passing through a lens 8 and impinging on a focal plane array 6 of a wide-angle color camera, the angle of incidence being large at the edges of the focal plane. Again the focal plane array 6 is covered by a color filter array 4. FIG. 7A shows how light actually arrives at a camera's focal plane array. At the center of the focal plane array 6 (which is on the camera's optical axis), light arrives perpendicular to the surface of the focal plane array 6 (i.e., angle of incidence is zero). Near the edges, however, light arrives at a substantial angle.

Figure 7B:
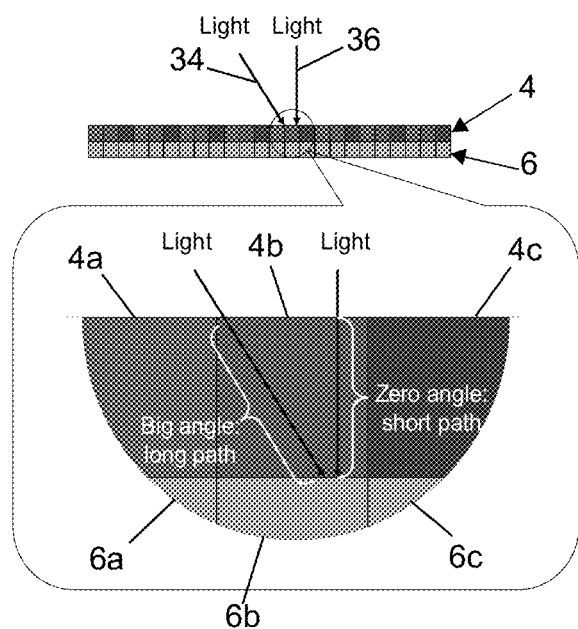
FIG. 7B is a diagram showing two rays of light impinging on a photosensor of a focal plane array of a CCD image sensor covered by a color filter. One light ray arrives at a 90° angle and the other light ray arrives at an angle which is less than 90° relative to the surface of the photosensor. The diagram shows that the optical path length changes as a function of angle of incidence.

FIG. 7B is a diagram showing two rays of light 34 and 36 impinging on a photosensor 6b of a focal plane array 6 covered by green filter 4b. In this example, adjacent photosensors 6a and 6c are respectively covered by red and blue filters 4a and 4c. (Note: This is not the sequence of colors in a Bayer filter and is presented in this manner for the purpose of illustration only.) One light ray 36 arrives at a zero angle of incidence and the other light ray 34 arrives at a large angle of incidence relative to the surface of the photosensor 6b. This diagram shows that the optical path length changes as a function of angle of incidence. More specifically, FIG. 7B shows the effect: at a large angle of incidence, the light travels a longer distance through the filter material than when it arrives with a small angle of incidence. That means greater optical depth in accordance with Eq. (4), so more light of each wavelength is absorbed by the green filter 4b. The same principle applies to each filter regardless of color.

Figure 8:
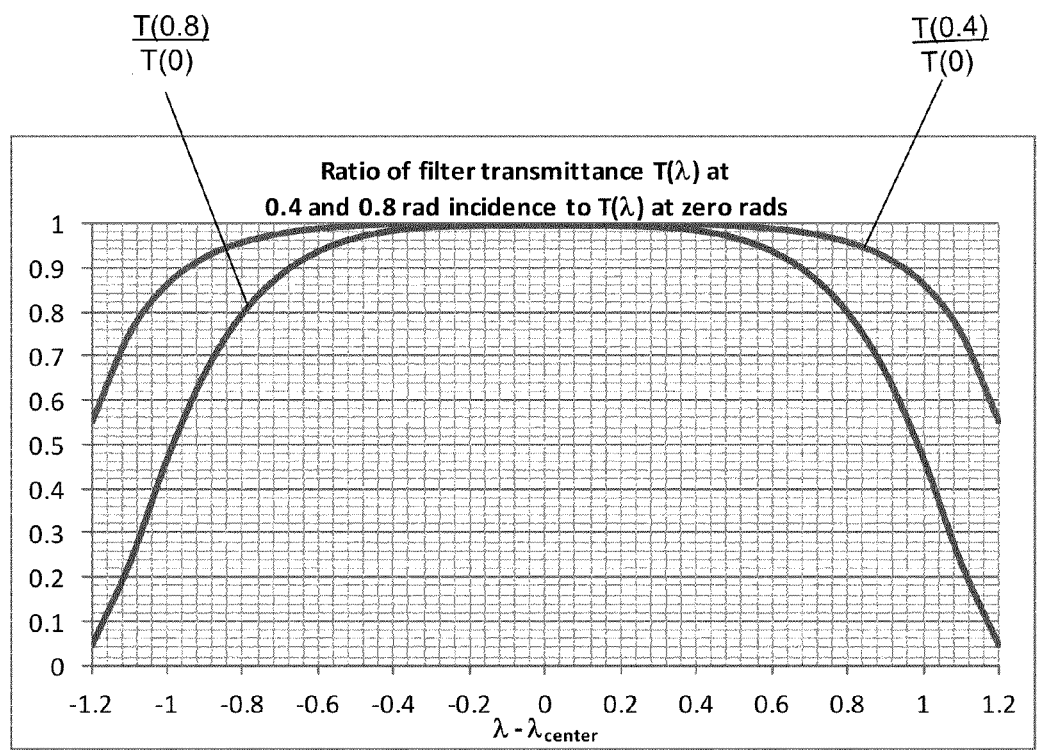
FIG. 8 is a graph that shows how transmittance of a one-color filter varies by wavelength over three angles: zero, 0.4 radian, and 0.8 radian. The horizontal axis is wavelength relative to the center of a filter's spectral band ($\lambda_{center}$). The vertical axis is the ratio of the transmittance at each combination of (angle, wavelength) to the transmittance at the nominal combination (angle=0, wavelength=center of the band).

The increased absorption near the edges of the focal plane array 6 is not the same for all wavelengths. FIG. 8 shows how transmittance of a one-color filter varies by wavelength over three angles: zero, 0.4 radian, and 0.8 radian. The horizontal axis is wavelength relative to the center of a filter's spectral band. The vertical axis is the ratio of (1) transmittance at each combination of (angle, wavelength), to (2) the transmittance at the nominal combination (angle=0, wavelength=center of the band).

As seen in FIG. 8, transmittance drops more at the large angle (0.8 rad) than at the small angle (0.4 rad). Also the relative drop at large angles is greater for wavelengths farther from the center. That is, the filter passes a narrower range of wavelengths at larger angles of incidence.

Figure 9:
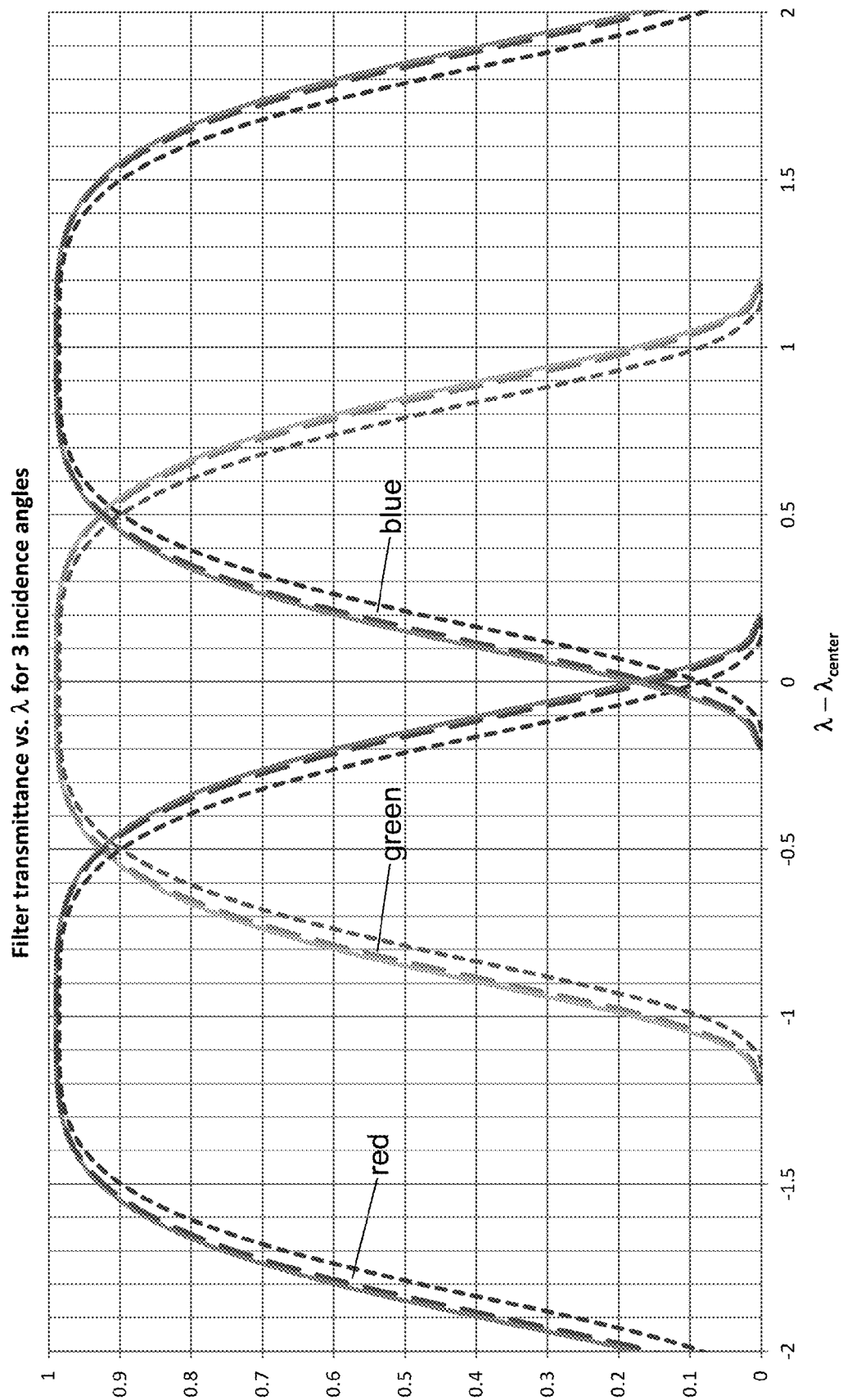
FIG. 9 is a graph of filter transmittance versus wavelength for light impinging on red, green and blue filters for the camera whose center-of-CCD response was shown in FIG. 5.

This effect applies to all colors in the camera. FIG. 9 shows how it changes the spectral bands of the camera whose center-of-FPA response was shown in FIG. 5. For each of three colors (red, green and blue), three curves are drawn for respective angles of incidence: 0 rad (solid curve); 0.4 rad (dashed curve); and 0.8 rad (dotted curve). The filter bands change with angle of incidence (i.e., position on the focal plane). The system disclosed herein uses this effect to disentangle the contribution of several narrow spectral bands, and thereby calculate the intensity of light in those bands. These narrow bands are referred to herein as "synthetic bands" or "synthetic spectral bands", since the intensities in these bands are not directly measured, but are calculated from other information.

Some steps of a process for hyperspectral imaging in accordance with one embodiment will now be described in detail.

Characterization of Transmittance Vs. Angle of Incidence

As previously disclosed, if insufficient technical information about the camera is available, a calibration process is used to characterize how the optical transmittance of the color filter varies with incidence angle at various wavelengths. The goal of this step is to produce the mathematical equivalent of curves like those seen in FIG. 9. These can be produced in at least two ways:

1. Given technical information on the thickness of the color filters and their absorptivity versus wavelength (which may be given as a lookup table or an equation), a skilled person can write equations for these curves: one each for red, green, and blue.

2. The manufacturer or the user can measure the camera's response using known, spectrally narrow light sources (targets) at various known angles from the optical axis, and doing so for photosensors covered by red, green, and blue filters. These measurements may be saved as lookup tables or as the coefficients of equations fitted to the data. [Note that a skilled person may either measure angles from the optical axis by using an instrument like an encoder or, given focal length of the lens and pitch of the pixels, translating pixel location (row, column) into angle from the center of the focal plane array.]

The output of this step is three transmittance functions $T(\lambda, \theta)$, one each for red, green, and blue, that define the color filters' transmittance at each of many narrow spectral bands for each of many incidence angles. The number of bands and their spectral widths may vary by application and embodiment, but in general, characterizing more bands with narrower widths allows more precise spectral measurement of unknown scenes. Typically, this characterization step is performed only once in the life of a camera, or even once for a whole product line of cameras.

Choosing a Set of Synthetic Spectral Bands for Images

For a given application, the designer or user chooses the synthetic spectral bands whose intensities he or she would like to measure. Loosely, this means defining a set of central wavelengths $\lambda_{center\_j}$ for j=1, 2, ..., M. More precisely, it means defining boundaries between bands. There are M+1 boundaries for M contiguous bands: $\lambda_1$ is the lower boundary of band 1; $\lambda_j$ is the upper boundary of band j−1 and the lower boundary of band j for 1<j<M; and $\lambda_{M+1}$ is the upper boundary for band M.

Choosing M, the number of bands, determines the minimum number of images to capture. (The computer must solve at least M simultaneous equations with M unknowns, so the user must capture at least N=M/3 images showing each scene point of interest in red, green, and blue.)

In some embodiments or applications, the user can select the synthetic spectral bands after a series of images has been captured. This flexible post-capture analysis is not possible with a conventional hyperspectral camera where the bands are fixed by the hardware.

Figure 10A:
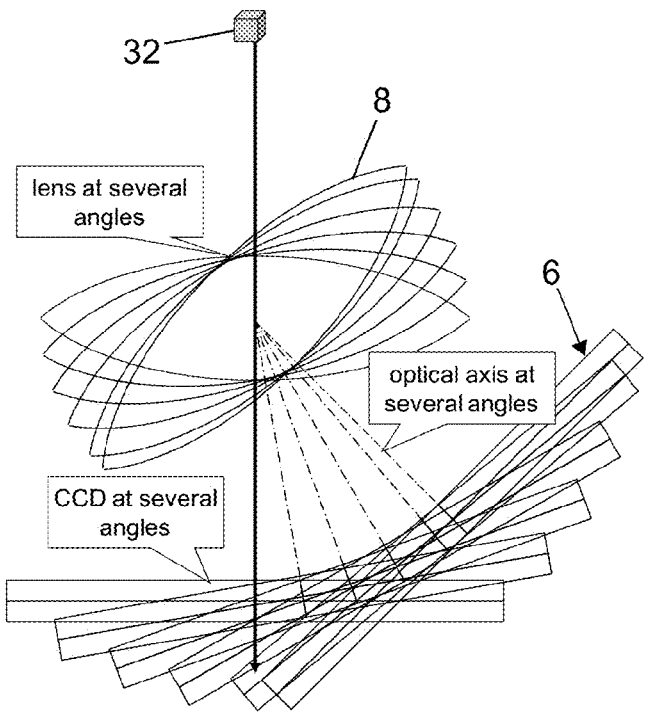
FIGS. 10A and 10B are diagrams showing capture of multiple images of a target from the same location, rotating the color camera to a different angle between successive images.
Figure 10B:
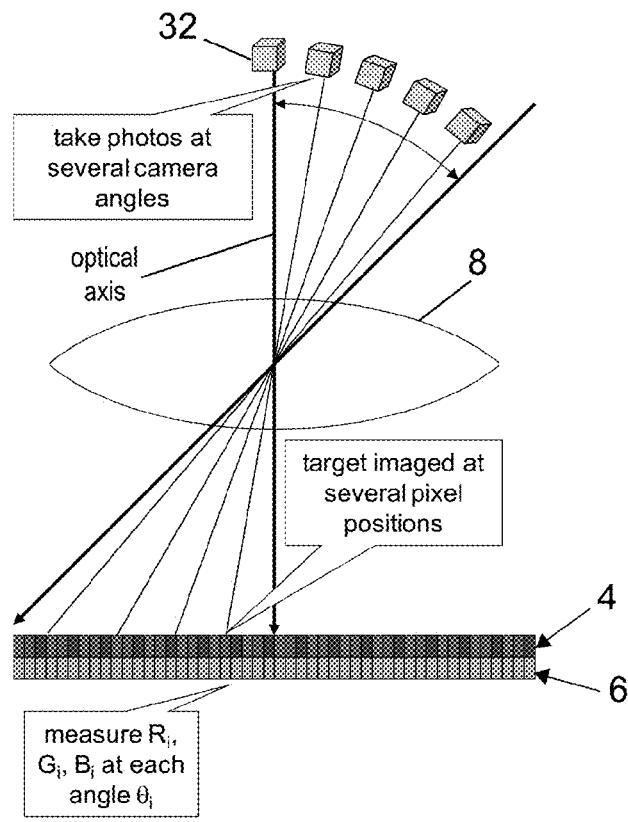

When the user selects a target where he or she wants to acquire a multispectral image, the first step is to take a number N of photos at several angles as shown in FIGS. 10A and 10B. Specifically, the user keeps the camera at a fixed location, but changes its orientation between images so the target 32 (shown as a cube in FIGS. 10A and 10B) is imaged on the focal plane array 6 (e.g., of a CCD image sensor) at various distances from the center of the focal plane. FIG. 10A shows the rotation of the focal plane array 6 and the lens 8 in the target frame of reference. FIG. 10B shows the rotation in the camera frame of reference, i.e., the target 32 appears to rotate about an axis perpendicular to the lens axis. The target 32 is imaged at several pixel positions. Let i be the index of each image. The intensity values $(r_i, g_i, b_i)$ are measured at each angle $\theta_i$, which is measured from the optical axis of the lens 8.

For some applications, the camera is mounted to a flight vehicle (e.g., an unmanned aerial vehicle). In such a case, the camera's orientation can be controlled by maneuvering the vehicle (i.e., the camera need not be rotatable relative to the flight vehicle). The pixel values are measured for different camera orientations. One embodiment using a camera mounted on an unmanned aerial vehicle will be described in more detail below with reference to FIG. 12.

Processing the Images to Resolve Fine Spectral Bins

Figure 11:
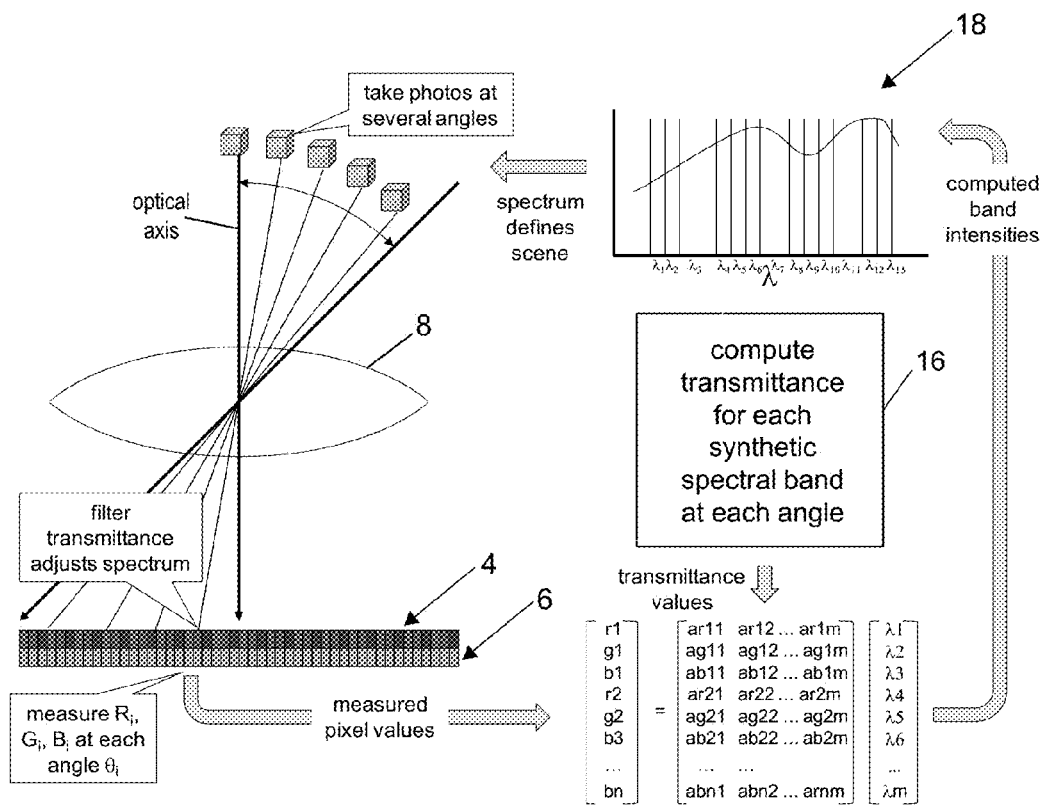
FIG. 11 is a flowchart shows steps of a method for acquiring the intensities of synthetic spectral bands based on RGB measurements of a scene in accordance with one embodiment.

FIG. 11 is a flowchart that shows steps of a method for acquiring the intensities of synthetic spectral bands based on RGB measurements of a scene in accordance with one embodiment. The image capture process outputs a set of N digital images. The transmittance of the color filter array 4 adjusts the spectrum of each image captured at a respective angle $\theta_i$ from the optical axis of the lens 8.

Each image has numerous pixels, each pixel comprising an RGB triplet of intensity values. Then $(r_i, g_i, b_i)$ is the triplet of color values for a particular scene location—e.g., a particular petal on a flower—in image i. The computer stores these measured pixel values in a one-dimensional array as shown in FIG. 11, at lower right, on the left side of the matrix equation. (This array is called P in Eq. (5).)

Given a particular scene location r to analyze, the first processing step is to select the pixel in each image corresponding to that scene location. (How to do this is well-known in the art.) This gives a set of N RGB triplets:

$(r_1, g_1, b_1), (r_2, g_2, b_2) \ldots (r_N, g_N, b_N)$

The pixel coordinate (row i, column i) of the RGB triplet $(r_i, g_i, b_i)$ corresponds to some angle $\theta_i$ from the optical axis. For cameras with a flat focal plane array (i.e., nearly all cameras), $\theta_i$ is also the angle of incidence. Thus, the computer uses the coordinate (row i, column i) to compute the angle of incidence $\theta_i$ for the target in that image. (How to do this is well-known in the art.)

Given the values of $\theta_i$ for all images, the computer uses information from the earlier "characterize T versus angle" step to compute the transmittance $T(\lambda_j, \theta_i)$ for each synthetic spectral band $\lambda_j$ at each angle $\theta_i$ (step 16 in FIG. 11).

The computer stores these scalar transmittance values $T(\lambda_j, \theta_i)$ in a two-dimensional array T. The location where it stores each transmittance value is shown at the lower right in FIG. 11. The name of each element begins with "a", which is followed by a color label (r, g, or b) and two numerical indices. The first number identifies the image. The second number identifies a synthetic spectral band. For example, element ar12 is the transmittance of the red filter in synthetic spectral band 2 at the target's incidence angle in image 1; and element ag21 is the transmittance of the green filter in synthetic spectral band 1 at the target's incidence angle in image 2.

The matrix equation in FIG. 11 describes how the measured intensity values of the pixels are created by the unknown intensities of the synthetic spectral bands. Light from the target has a set of intensity values for each synthetic spectral band. If known, these values would appear in the right-hand one-dimensional array in FIG. 11. Matrix multiplication of these intensity values by the transmittance values would give the measured pixel values, i.e., the amount of light that gets through the filter to each photo-sensor as in Eq. (1)

However, the user and the computer do not yet know the intensities of the synthetic spectral bands. Instead, the computer inverts the matrix of transmittance values T. It multiplies the inverted matrix $T^{-1}$ by the array of measured pixel values P:

$$T^{-1}P=I \quad (5)$$

The product I is an array 18 of computed intensity values for the synthetic spectral bands. These values are for the particular scene location r. The same process is applied to other scene locations $r_k$ to compute intensities of the synthetic spectral bands at multiple points—potentially every pixel-sized scene location that is visible in all N images.

Closed Flight Path

As previously mentioned, for some applications the camera is mounted to a flight vehicle (e.g., an unmanned aerial vehicle). In such a case, the camera's orientation can be controlled by maneuvering the vehicle (i.e., the camera need not be rotatable relative to the flight vehicle).

Figure 12:
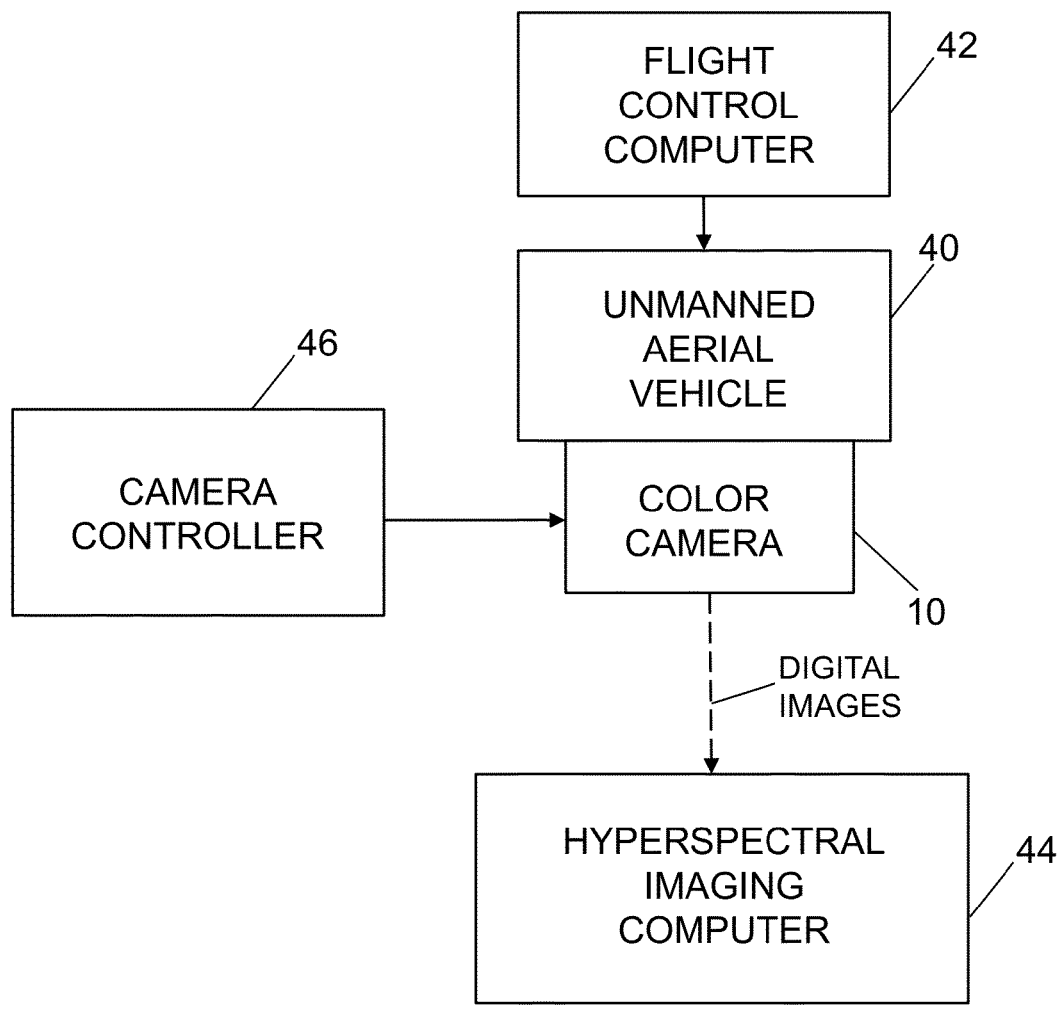
FIG. 12 is a block diagram showing a hyperspectral imaging system in accordance with an alternative embodiment.

FIG. 12 is a block diagram showing a hyperspectral imaging system in which a camera 10 is mounted on an unmanned aerial vehicle 40. The camera 10 comprises a multi-color filter array and an array of photosensors (not shown in FIG. 12, but see FIG. 5). The flight path of unmanned aerial vehicle 40 is controlled by an onboard flight control computer 42. The camera 10 may be controlled by an onboard camera controller 46 (a computer or a processor). Both the flight control computer 42 and the camera controller 46 may be preprogrammed or may receive instructions from a ground computer (not shown in FIG. 12). Accordingly, the unmanned aerial vehicle 40 and the camera 10 can be synchronized or coordinated so that camera 10 will be at about the same position but will have different orientations for each image of a series of N images of a scene to be captured by the camera.

One method for measuring the spectrum of at least one point in a scene using camera 10 mounted on unmanned aerial vehicle 40 comprises the following steps. First, the camera 10 is characterized in the manner previously described, i.e., by measuring a transmittance as a function of wavelength and of incidence angle. Then the unmanned aerial vehicle 40 with attached camera 10 is launched and flown to the latitude, longitude and altitude (hereinafter "one three-dimensional coordinate position") where a scene is to be surveyed. The unmanned aerial vehicle 40 is flown along N flight paths that intersect at the one three-dimensional coordinate position, the unmanned aerial vehicle 40 at the one three-dimensional coordinate position being oriented during each flight along each flight path such that the camera has a respective one of N orientations. A scene is within a field of view of the camera during each pass of the unmanned aerial vehicle 40 through the one three-dimensional coordinate position. Light from a point in the scene respectively impinges on first through N-th photosensor of the camera as the camera captures a respective one first through N-th images during each pass through the one three-dimensional coordinate position by the unmanned aerial vehicle 40. The color camera 10 may transfer the first through N-th images to a hyperspectral imaging computer 44, e.g., by means of a wireless data downlink. The hyperspectral imaging computer 44 is programmed to compute the spectrum of the point in the scene based on first through N-th images in the manner previously described.

When using a flight vehicle (e.g., an unmanned aerial vehicle) to control the orientation of the camera, the flight vehicle may move (translate) between images due to the flight vehicle's minimum airspeed. In accordance with the embodiment disclosed in the preceding paragraph, the unmanned aerial vehicle can be flown in a circle or other closed path to return to the same position, but with different orientations, each time it takes a picture. The different orientations of the flight vehicle are selected such that the angle of the optical axis of the onboard color camera relative to the target is varied (as described above). This assures that all images are captured with the same view of the target, which avoids spectral distortions caused by changing the scattering angle.

Alternate Embodiments

Interferometric Filters

In the disclosure above, color filters are described as absorbing light strongly at some wavelengths and weakly at others. The color filters on some camera CCDs are interferometric rather than absorptive. In these cameras, when light reaches the filter at non-perpendicular incidence, the filter transmits light at longer wavelengths than when light arrives at perpendicular incidence. That is, the transmitted band does not get narrower; instead, it moves to longer wavelengths. The mathematical treatment of this effect is somewhat different than with absorptive filters, but should be apparent to persons skilled in the art.

Wide Aperture:

In the drawings, light is shown as a narrow beam from the target to the focal plane array. This corresponds to a narrow aperture in the camera. Some embodiments deal with varying aperture width. In those cases, portions of the light pass through different regions of the lens and arrive at the CCD with different angles. The math and/or the calibration are more complicated, but should be apparent to persons skilled in the art.

Curved Focal Plane Array:

Some cameras have a curved focal plane array. In those cases, the angle from the camera's optical axis is not the same as the angle of incidence. The system disclosed above can be readily modified to deal with this complication.

Rotation about the Optical Axis.

Rotation about the lens axis, i.e., the camera's optical axis, has no effect on transmittance. Some embodiments may allow this rotation because it is easier to maneuver a vehicle or gimbal without constraining rotation about that axis. Others may prefer to avoid this rotation to make image registration easier.

Optimal Choice of Synthetic Spectral Bands.

In some embodiments, the synthetic spectral bands match the bands established in the characterization step. This reduces the processing power needed by the computer because no interpolation is needed. In some embodiments, the synthetic spectral bands are defined by singular value decomposition or a similar method. This extracts the maximum spectral information from the images.

Variable Shape of Synthetic Spectral Bands.

In the discussion above, the synthetic spectral bands are rectangular: their value is unity between the upper and lower boundaries and zero outside those boundaries. In some embodiments, synthetic spectral bands are not rectangular blocks. Spectral bands of any shape can be deconvolved, e.g., Gaussian-shaped bands.

Use of Angle Encoder.

In typical embodiments, the computer computes the angle between the line of sight to the target and the camera's optical axis using the pixel location of the image of the target. In alternate embodiments, the computer uses direct measurements of camera angle, e.g., an angle encoder or orientation data from the inertial measurement unit of an airborne platform.

The systems and methods for hyperspectral imaging disclosed may have various advantages.

Compared to various types of hyperspectral cameras, the systems disclosed above are cheaper and more reliable. In mobile applications that use a vehicle (such as an unmanned aerial vehicle) to maneuver the camera, the system is also lighter in weight and takes less volume than a hyperspectral camera. In addition, the systems disclosed above can be used to measure intensity of spectral bands chosen after images are captured. Known hyperspectral cameras cannot do this.

Compared to a regular color camera in an airborne application, the systems disclosed above may have the same cost, weight, and volume, but produce images with much finer spectral resolution. The disclosed systems do not require collecting supplemental data with an extra system such as radar; nor do the disclosed systems require physical contact with the target area.

While systems and methods for hyperspectral imaging have been described with reference to various embodiments, it will be understood by those skilled in the art that various changes may be made and equivalents may be substituted for elements thereof without departing from the scope of the claims set forth hereinafter. In addition, many modifications may be made to adapt the teachings herein to a particular situation without departing from the scope of the claims.

As used in the claims, the term "computer system" should be construed broadly to encompass a system having at least one computer or processor, and which may have multiple computers or processors that communicate through a network or bus. As used in the preceding sentence, the terms "computer" and "processor" both refer to devices having a processing unit (e.g., a central processing unit) and some form of memory (i.e., computer-readable medium) for storing a program which is readable by the processing unit.

The method claims set forth hereinafter should not be construed to require that the steps recited therein be performed in the order in which they are recited. Nor should they be construed to exclude any portions of two or more steps being performed concurrently or alternatingly.

The invention claimed is:

1. A method for measuring a spectrum of at least one point in a scene using a camera which comprises a three-color filter array and an array of photosensors, the method comprising:

calibrating the camera by measuring transmittance values of the filters of the three-color filter array for each one of a multiplicity of synthetic spectral bands at a multiplicity of angles of incidence;

moving the camera to a first location comprising a position and an orientation so that a scene is within a field of view of the camera;

capturing a first image of the scene while the camera is at said first location;

moving the camera to a second location comprising approximately the same position and a different orientation so that the scene is within the field of view of the camera;

capturing a second image of the scene while the camera is at said second location;

transferring the first and second images from the camera to a computer system; and computing the spectrum of a point in the scene based on image data of said first and second images acquired by respective photosensors receiving light from said point and measured transmittance values of respective filters of the three-color filter array disposed in front of the respective sensors receiving light from said point, said computing being performed by the computer system.

2. The method as recited in claim 1, wherein said calibrating step comprises measuring a transmittance of a filter of the three-color filter array as a function of wavelength and of incidence angle.

3. The method as recited in claim 1, wherein the point in the scene is imaged in the first image at a first distance from the optical axis of the camera, and the point in the scene is imaged in the second image at a second distance from the optical axis of the camera, the second distance being different than the first distance.

4. The method as recited in claim 1, wherein the first image comprises a first pixel corresponding to the point in the scene, and the second image comprises a second pixel corresponding to the point in the scene, the first and second pixels respectively comprising first and second RGB triplets of intensity values.

5. The method as recited in claim 4, further comprising:
computing a first set of transmittance values of a first filter of the three-color filter array for a multiplicity of synthetic spectral bands at a first angle of incidence of a light ray from the point in the scene to a first photosensor corresponding to the first pixel;
computing a second set of transmittance values of a second filter of the three-color filter array for the multiplicity of synthetic spectral bands at a second angle of incidence of a light ray from the point in the scene to a second photosensor corresponding to the second pixel; and
forming a matrix of transmittance values that includes the first and second sets of transmittance values,
wherein computing the spectrum comprises respectively multiplying the intensity values of the first and second RGB triplets by elements of a matrix which is an inverse of the matrix of transmittance values.

6. The method as recited in claim 1, wherein the camera is attached to a vehicle or a robot.

7. The method as recited in claim 6, wherein moving the camera comprises maneuvering the vehicle or robot.

8. The method as recited in claim 6, wherein the vehicle is one of the following group: an aircraft, a spacecraft, a ground vehicle, a boat, or a submersible.

9. The method as recited in claim 1, wherein the computed spectrum comprises intensity values for each of a multiplicity of synthetic spectral bands.

10. The method as recited in claim 9, wherein at least one synthetic spectral band is chosen after capture of the first image.

11. A method for measuring a spectrum of at least one point in a scene, comprising:
characterizing a camera which comprises a multi-color filter array and an array of photosensors;
locating the camera at a position with a first orientation so that a scene is within a field of view of the camera;
capturing a first image of the scene while the camera is at said position with said first orientation;
locating the camera at said position with a second orientation so that the scene is within the field of view of the camera;
capturing a second image of the scene while the camera is at said position with said second orientation;
transferring the first and second images from the camera to a computer system; and
computing the spectrum of a point in the scene based on at least said first and second images, said computing being performed by the computer system,
wherein characterizing the camera comprises measuring a transmittance as a function of wavelength and of incidence angle.

12. The method as recited in claim 11, wherein the point in the scene is imaged in the first image at a first distance from the optical axis of the camera, and the point in the scene is imaged in the second image at a second distance from the optical axis of the camera, the second distance being different than the first distance.

13. The method as recited in claim 11, wherein the first image comprises a first pixel corresponding to the point in the scene, and the second image comprises a second pixel corresponding to the point in the scene, the first and second pixels respectively comprising first and second RGB triplets of intensity values.

14. The method as recited in claim 11, wherein the camera is attached to a vehicle or a robot.

15. A method for measuring a spectrum of at least one point in a scene, comprising:
characterizing a camera which comprises a multi-color filter array and an array of photosensors;
locating the camera at a position with a first orientation so that a scene is within a field of view of the camera;
capturing a first image of the scene while the camera is at said position with said first orientation, wherein the first image comprises a first pixel corresponding to a point in the scene and comprising a first RGB triplet of intensity values;
locating the camera at said position with a second orientation so that the scene is within the field of view of the camera;
capturing a second image of the scene while the camera is at said position with said second orientation, wherein the first image comprises a first pixel corresponding to the point in the scene and comprising a second RGB triplet of intensity values;
capturing a second image of the scene while the camera is at said position with said second orientation;
transferring the first and second images from the camera to a computer system;
computing a first set of transmittance values for a multiplicity of synthetic spectral bands at a first angle of incidence of a light ray from the point in the scene to a first photosensor corresponding to the first pixel;

computing a second set of transmittance values for the multiplicity of synthetic spectral bands at a second angle of incidence of a light ray from the point in the scene to a second photosensor corresponding to the second pixel;

forming a matrix of transmittance values that includes the first and second sets of transmittance values; and computing the spectrum of the point in the scene based on at least said first and second images by respectively multiplying the intensity values of the first and second RGB triplets by elements of a matrix which is an inverse of the matrix of transmittance values, wherein the computing steps are performed by the computer system.

16. The method as recited in claim 15, wherein the camera is attached to a vehicle or a robot.

17. The method as recited in claim 16 wherein locating the camera comprises maneuvering the vehicle or robot.

18. The method as recited in claim 16, wherein the vehicle is one of the following group: an aircraft, a spacecraft, a ground vehicle, a boat, or a submersible.

19. A method for measuring a spectrum of at least one point in a scene, comprising:
    characterizing a camera which comprises a multi-color filter array and an array of photosensors;
    locating the camera at a position with a first orientation so that a scene is within a field of view of the camera;
    capturing a first image of the scene while the camera is at said position with said first orientation;
    locating the camera at said position with a second orientation so that the scene is within the field of view of the camera;
    capturing a second image of the scene while the camera is at said position with said second orientation;
    transferring the first and second images from the camera to a computer system; and
    computing the spectrum of a point in the scene based on at least said first and second images, said computing being performed by the computer system, wherein the computed spectrum comprises intensity values for each of a multiplicity of synthetic spectral bands.

20. The method as recited in claim 19, wherein at least one synthetic spectral band is chosen after capture of the first image.

* * * * *